US007991358B2

(12) United States Patent
Kim et al.

(10) Patent No.: US 7,991,358 B2
(45) Date of Patent: Aug. 2, 2011

(54) METHOD FOR REDUCING AN AMOUNT OF FEEDBACK USED IN A MOBILE COMMUNICATION SYSTEM

(75) Inventors: Dai-Kwan Kim, Seoul (KR); Jong-Hyung Kwun, Seongnam-si (KR); Jeong-Ho Jeon, Pohang-si (KR); Song Chong, Seongnam-si (KR); Hyang-Won Lee, Daejeon (KR); Kyu-Ho Son, Daejeon (KR)

(73) Assignees: Samsung Electronics Co., Ltd, Suwon-si (KR); Korea Advanced Institute of Science and Technology (KAIST), Daejeon (KR)

( * ) Notice: Subject to any disclaimer, the term of this patent is extended or adjusted under 35 U.S.C. 154(b) by 693 days.

(21) Appl. No.: 12/047,573

(22) Filed: Mar. 13, 2008

(65) Prior Publication Data
US 2008/0227395 A1  Sep. 18, 2008

(30) Foreign Application Priority Data

Mar. 13, 2007  (KR) .................. 10-2007-0024562

(51) Int. Cl.
*H04B 15/00* (2006.01)
*H04B 17/00* (2006.01)

(52) U.S. Cl. ........... 455/62; 455/517; 370/203; 370/249
(58) Field of Classification Search .................. 455/62, 455/517; 370/203, 233, 249, 252
See application file for complete search history.

(56) References Cited

U.S. PATENT DOCUMENTS

| 2005/0068884 | A1* | 3/2005 | Yoon et al. ..................... 370/203 |
| 2005/0201295 | A1* | 9/2005 | Kim et al. ........................ 370/241 |
| 2007/0098093 | A1  | 5/2007 | Kwon et al. |

FOREIGN PATENT DOCUMENTS

KR  10-2007-0027845 A  3/2007

OTHER PUBLICATIONS

Joo Heo et al., MIM MB-OFDM, Technical Paper, Oct. 2004, pp. 1177-1188, vol. 29, No. 10A.

* cited by examiner

*Primary Examiner* — Tuan H Nguyen
(74) *Attorney, Agent, or Firm* — Jefferson IP Law, LLP

(57) ABSTRACT

A method for feeding back a Channel Quality Indicator (CQI) in a mobile communication system is provided. The method includes determining a number of subchannels for which the MS feeds back CQIs based on a preset feedback efficiency factor, selecting the determined number of subchannels in a descending order of channel quality, and feeding back the CQIs of the selected subchannels to a Base Station (BS).

18 Claims, 3 Drawing Sheets

METHOD FOR REDUCING AN AMOUNT OF FEEDBACK USED IN A MOBILE COMMUNICATION SYSTEM

PRIORITY

This application claims the benefit under 35 U.S.C. §119(a) of a Korean patent application filed in the Korean Intellectual Property Office on Mar. 13, 2007 and assigned Serial No. 2007-24562, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co., Ltd. and the Korea Advanced Institute of Science and Technology.

BACKGROUND OF THE INVENTION

1. Field of the Invention

The present invention relates to a mobile communication system. More particularly, the present invention relates to a method for reducing the amount of feedback that a Mobile Station (MS) transmits to a Base Station (BS).

2. Description of the Related Art

The provision of services with diverse Quality of Service (QoS) requirements at high data rates is an area being studied for a future-generation communication system called a $4^{th}$ Generation (4G) communication system. In particular, research is being conducted on providing a high-speed service that ensures mobility and QoS in a Broadband Wireless Access (BWA) communication system, such as Wireless Local Area Network (WLAN) and Wireless Metropolitan Area Network (WMAN).

For the 4 G communication system, the use of Orthogonal Frequency Division Multiplexing (OFDM)/Orthogonal Frequency Division Multiple Access (OFDMA) is being considered for high-speed data transmission on wired/wireless channels. OFDM/OFDMA is a data transmission scheme that uses multiple carriers.

An example of an OFDM/OFDMA system is an Institute of Electrical and Electronics Engineers (IEEE) 802.16 communication system. The IEEE 802.16 communication system is capable of high-speed data transmission because of its use of a plurality of subcarriers.

To support high-speed data transmission, the IEEE 802.16 communication system employs many techniques including Adaptive Modulation and Coding (AMC). AMC is a data transmission scheme that adaptively uses a modulation and coding scheme according to the channel state between the MS and a BS, thus improving the overall use efficiency of a cell.

For AMC, a plurality of modulation schemes and a plurality of coding schemes are defined and a channel signal is encoded and modulated using a combination of modulation and coding schemes. Combinations of the modulation and coding schemes are called Modulation and Coding Schemes (MCSs). According to the number of MCSs, level 1 to level N are defined. That is, AMC adaptively selects an MCS level for the MS according to the channel state between the MS and the BS. Therefore, the overall system efficiency is improved.

The use of AMC requires a feedback of information about the state of a downlink channel, i.e. the communication of a Channel Quality Indicator (CQI) from the MS to the BS in the IEEE 802.16 communication system.

Conventional feedback methods are described below.

(1) Best-M feedback: the MS feeds back the CQIs of M subchannels to the BS in a descending order of channel state. FIG. 1 illustrates the conventional Best-M feedback method.

Referring to FIG. 1, each MS feeds back channel information about M subchannels. The Best-M feedback method works well in conjunction with Proportional Fairness (PF) scheduling in which the same number of resources, i.e. time slots, on average are allocated to each MS over a long term.

Max Carrier-to-Interference (C/I) scheduling maximizes the sum of the average data rates of MSs. Since an MS experiencing a relatively good channel state also feeds back information about M subchannels in the Best-M feedback method, the MS loses the chance of being allocated more subchannels. In terms of system capacity, the Best-M feedback method is not efficient when used in conjunction with Max C/I scheduling.

On the other hand, despite a low probability of being scheduled by a Max C/I scheduler, MSs experiencing a bad channel state feed back channel information about M subchannels, resulting in wasted resources. A Max-Min Fair scheduler allocates more time slots to the MSs experiencing the poor channel state to keep their data rates at the same level as those of MSs experiencing the good channel state. Consequently, as with Max C/I scheduling, Max-Min Fair scheduling causes a loss in fairness as well as feedback inefficiency when compared to the Best-M feedback method.

(2) Absolute Signal-to-Noise Ratio (SNR) Thresholding (AST) feedback: each MS performs a CQI feedback only when its SNR is equal to or higher than a preset threshold. The feedback condition is given by $$r_k(t) \geq r_{th} \quad (1)$$

where $r_k$ denotes the SNR of MS k and $r_{th}$ denotes the SNR threshold. According to equation (1), the MS determines whether to feed back an instantaneous SNR at time t.

Because MSs with SNRs below the threshold do not feed back their channel state information, the ATS feedback method excludes these MSs from scheduling, which is not favorable in terms of fairness.

(3) Normalized SNR Thresholding (NST) feedback: each MS feeds back channel information only if its normalized SNR is equal to or higher than a preset threshold. The feedback condition is $$\frac{\gamma_k(t)}{\gamma_k} \geq A \quad (2)$$

where $\gamma_k$ denotes the average SNR of MS k and A denotes the threshold. The NST feedback method is a case of the AST feedback method taking into account the characteristics of a PF scheduler. The NST feedback method is similar to the Best-M feedback method in that each MS feeds back channel information about a preset ratio of subchannels in good states to subchannels available to the MS over a long period of time. This means that NST feedback has the shortcomings of Best-M feedback.

An IEEE 802.16 communication system using the AMC feedback method for slow moving MSs can operate a differential feedback scheme along with the Best-M feedback method. Specifically, a slow moving MS transmits to a BS an REP-RSP message including a bitmap that indicates five bands and their CQIs during an initial feedback. Then the slow moving MS transmits the CQI differentials of the five bands in a 1-dB stepwise manner to the BS. If any of the five bands is changed, the slow moving MS transmits an REP-RSP message with a bitmap indicating the new five bands and their CQIs to the BS. Meanwhile, a fast moving MS can operate in diversity mode where it transmits one representative CQI being the average CQI of all of the bands.

If the channel variation of the slow or fast moving MS is larger than 1 dB, accurate channel tracking is not possible, which may cause prediction errors. Also, when the five bands change frequently, the resulting message exchanges may increase signaling overhead.

SUMMARY OF THE INVENTION

An aspect of exemplary embodiments of the present invention is to address at least the above-mentioned problems and/or disadvantages and to address at least the advantages described below. Accordingly, an aspect of exemplary embodiments of the present invention is to provide a method for reducing the amount of feedback transmitted from an MS in a mobile communication system.

In accordance with an aspect of an exemplary embodiment of the present invention, a method for feeding back a Channel Quality Indicator (CQI) from an MS in a mobile communication system is provided. The method includes determining a number of subchannels for which the MS feeds back CQIs based on a preset feedback efficiency factor, selecting the determined number of subchannels in a descending order of channel quality, and feeding back the CQIs of the selected subchannels to a Base Station (BS).

In accordance with another aspect of an exemplary embodiment of the present invention, a method for feeding back a Channel Quality Indicator (CQI) from a plurality of Mobile Stations (MSs) in a mobile communication system is provided. The method includes determining, for each of the plurality of MSs, a number of subchannels for which the each MS feeds back CQIs, wherein the respective number of subchannels for which the each MS feeds back CQ is determined such that a substantially constant ratio is maintained of a sum of the number of subchannels of all of the plurality of MSs for which CQIs are to be fed back to a total number of subchannels allocated to all of the plurality of MSs, selecting, by each of the plurality of MSs, the determined number of subchannels, and feeding back the CQIs of the selected subchannels to a Base Station (BS)

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an efficient feedback method for any mobile communication system in which a variety of schedulers can operate.

For this purpose, a "feedback efficiency factor" defined as the ratio of subchannels whose channel information an MS feeds back to the average number of subchannels allocated to the MS.

A particular MS determines a feedback amount that satisfies a preset feedback efficiency factor and feeds back the CQIs of subchannels in a descending order of SNR to a BS, taking into account the feedback amount. Each subchannel includes at least one subcarrier.

To meet the feedback efficiency factor e preset during system designing or during a system redesign, the MS computes the number of subchannels of which the CQIs are to be fed back by $$f_k = n \text{int} \left( \frac{\bar{s}_k(t)}{e} \right) \qquad (3)$$

where n int(•) represents a nearest integer function, $\bar{s}_k(t)$ denotes the average number of subchannels allocated to MS k, and the feedback efficiency factor e is between 0 and 1. $\bar{s}_k(t)$ can be determined in an exponential weighted moving average scheme by $$\bar{s}_k(t+1) = \left(1 - \frac{1}{t_e}\right) \times \bar{s}_k(t) + \left(\frac{l}{t_e}\right) \times s_k(t) \qquad (4)$$

where $t_e$ denotes a window length used for computing the average number of allocated subchannels and $s_k(t)$ denotes the current number of allocated subchannels. The number of subchannels allocated to the MS in each time slot is known from a control message, for example, a MAP message.

Figure 1:
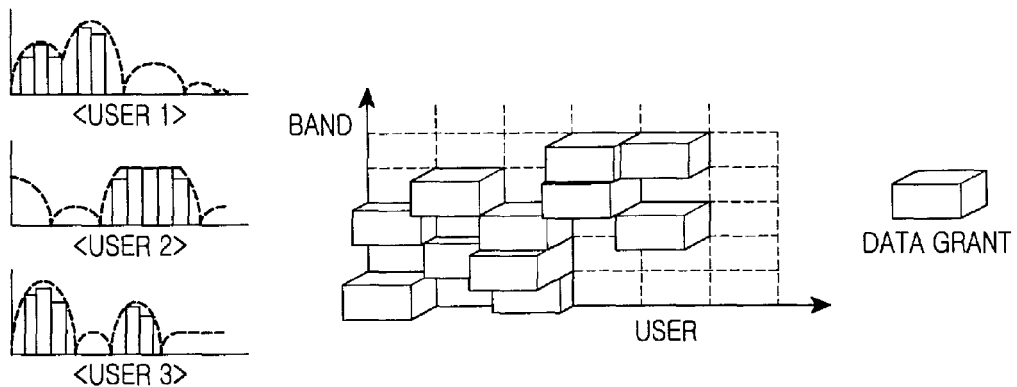
FIG. 1 illustrates a conventional Best-M feedback method.
Figure 2:
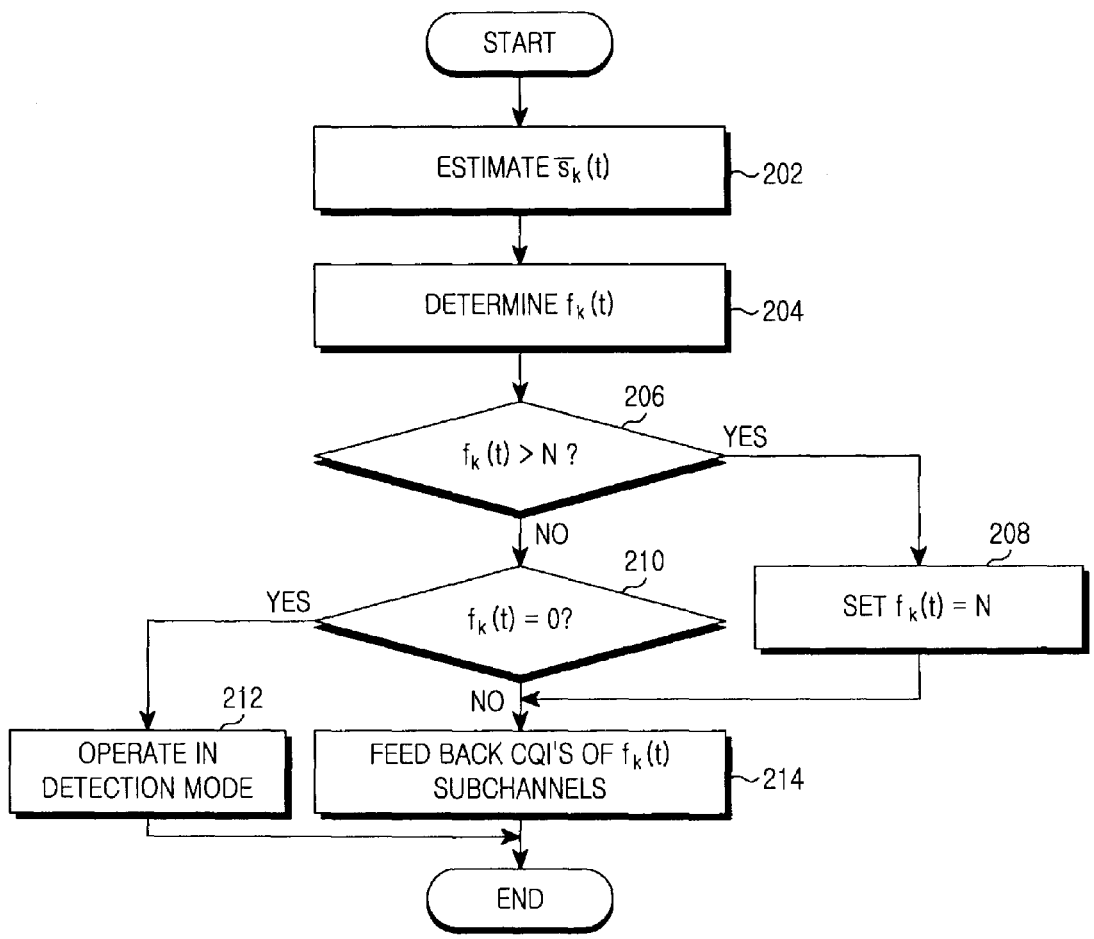
FIG. 2 is a flowchart illustrating an operation for determining a feedback amount in an MS according to an exemplary embodiment of the present invention.

FIG. 2 is a flowchart illustrating an operation for determining a feedback amount in an MS according to an exemplary embodiment of the present invention.

Referring to FIG. 2, the MS estimates the average number $\bar{s}_k(t)$ of subchannels allocated to it in step 202 and determines the number $f_k(t)$ of subchannels of which the CQIs are to be fed back in step 204.

In step 206, the MS compares $f_k(t)$ with the total number N of subchannels available in the system. If $f_k(t)$ is larger than N, the MS sets $f_k(t)$ to N in step 208 and goes to step 214.

On the other hand, if $f_k(t)$ is less than or equal to N, the MS compares $f_k(t)$ with 0 in step 210. If $f_k(t)$ is 0, the MS operates in detection mode in step 212. In the detection mode, the MS feeds back the CQI of a subchannel that has the highest probability of being in the best channel state. Thereby, the MS can determine whether the channel state or a scheduling policy has been changed. If $f_k(t)$ is not 0 in step 210, the process proceeds to step 214.

In step 214, the MS feeds back the CQIs of as many subchannels as $f_k(t)$.

According to the feedback efficiency factor e, a system performance degradation level and a total feedback amount are in a trade-off relationship. In other words, as the feedback efficiency factor e approaches 1, the total feedback amount is reduced but system performance is degraded. As the feedback efficiency factor e approaches 0, the total feedback amount increases but system performance is improved.

Conventionally, the total feedback amount increases with the number of MSs. In contrast, exemplary embodiments of the present invention use resources more efficiently by increasing the feedback amount of each MS, if a small number of MSs exist, and minimizes signaling overhead by reducing the feedback amount of each MS, if a large number of MSs exist. That is, the total feedback amount is kept at a preset level by maintaining a substantially constant ratio of sum of the number of subchannels of all MSs for which channel information is fed back to the total number of subchannels allocated to all MSs. The total feedback amount is given by $$E[F(t)] = E\left[\sum_{k=0}^{K} f_k(t)\right] = E\left[\sum_{k=0}^{K} \text{nint}\left(\frac{\bar{s}_k(t)}{e}\right)\right] \quad (5)$$

where F(t) denotes the sum of the numbers of subchannels of which the CQIs of all MSs fed back in time slot t. $f_k(t)$ is expressed as $$f_k(t) = \left(\frac{\bar{s}_k(t)}{e}\right) + err_k(t) \quad (6)$$

where $err_k(t)$ denotes a rounding error caused by the nearest integer function, its range being $$-\frac{1}{2} < err_k(t) \leq \frac{1}{2} \quad (7)$$

It can be assumed that the rounding error $err_k(t)$ has a uniform probability density function. Therefore, the total feedback amount is expected to be $$E[F(t)] = E\left[\sum_{k=0}^{K}\left(\frac{\bar{s}_k(t)}{e} + err_k(t)\right)\right] \quad (8)$$

$$= \frac{N}{e} + E\left[\sum_{k=0}^{K}(err_k(t))\right]$$

$$\cong \frac{N}{e}$$

Equation (8) reveals that the total feedback amount is substantially constant despite a change in the number of MSs.

For example, consider the case where the total number of subchannels N=24 and the feedback efficiency factor e=½. Under PF scheduling, for two MSs, an equal amount of resources (i.e. 12 subchannels) can be allocated to each MS on the average. Thus, each MS feeds back the CQIs of all 24 subchannels according to $$\frac{\bar{s}_k(t)}{e}$$

and the total sum of the feedback amounts of the two MSs is 48. For four MSs, six subchannels can be allocated to each MS on the average. Hence, each MS feeds back the CQIs of 12 subchannels and the total number of subchannels of which the CQIs are fed back by the MSs is maintained to be 48.

In the case where there are two MSs and the first MS is experiencing a better channel state than a second MS, the scheduling policy is Max C/I scheduling. If the first MS is experiencing a better channel state than the second MS in 20 subchannels out of 24 subchannels and the second MS is experiencing a better channel state than the first MS in the remaining four subchannels, a Max C/I scheduler schedules an MS experiencing the better channel state on individual subchannels in order to maximize total throughput. Thus, 20 subchannels are allocated to the first MS and four subchannels to the second MS. As a consequence, the first MS feeds back the CQIs of 40 subchannels and the second MS feeds back the CQIs of eight subchannels according to $$\frac{\bar{s}_k(t)}{e}.$$

Compared to conventional technologies in which a feedback amount is decided simply based on SNR irrespective of the characteristics of a scheduler, in exemplary embodiments of the present invention the number of subchannels of which the CQIs are to be fed back by each MS is decided using the average number of subchannels allocated to the MS. That is, an MS with more allocated subchannels feeds back a greater quantity of information. The average number of subchannels allocated to each MS can be used as the preference index of the MS for a particular scheduler.

In exemplary embodiments of the present invention, the total feedback amount is determined by the total number of subchannels and the feedback efficiency factor. This feature enables prediction of the quantity of control channels that are to be allocated for CQI feedback during an initial system design.

Exemplary embodiments of the present invention are particularly well suited for use in an OFDM mobile communication system. The feedback efficiency factor-based feedback scheme of exemplary embodiments of the present invention offers freedom in scheduler selection and minimizes signaling overhead, relative to the conventional Best-M feedback method. FIGS. 3 to 6 are graphs demonstrating the usefulness of the feedback scheme of exemplary embodiments of the present invention and Table 1 describes a simulation environment.

TABLE 1

| | |
|---|---|
| Carrier frequency | 2.3 GHz |
| Channel bandwidth | 5 MHz |
| Cell distance | 1 km |
| Path loss model (ITU-PED) | −37.6log10(R) − 16.62[dB] |
| Slow fading model | Log-normal distribution (8 dB) |
| Fast fading model | Jakes' fading |
| Thermal noise density | −174 dBm/Hz |
| BS power | 20(W) |
| SINR model | (RX power)/(RX power*0.01 + ICI + noise) |
| Mobility | ITU pedestrian B model |
| Frame length | 5 ms |
| Feedback factor setting | Efficiency based feedback: e = 1/6.25 |
| | Best-M feedback: M = 5 |
| | Absolute SNR feedback: threshold = 11.86 dB |
| | Normalized SNR feedback: A = 1.6 |
| | * The factors of Abs. and Nor. are set such that total feedback amount is approximate to that of Best-M and every feedback method has an equal feedback amount for 30 MSs, for fair comparisons in FIGs. 3 and 4. |

The simulation was performed in the context of an IEEE 802.16 communication system. An ITU pedestrian B model was taken as the user mobility model because AMC mode deals only with slow moving users.

Figure 3:
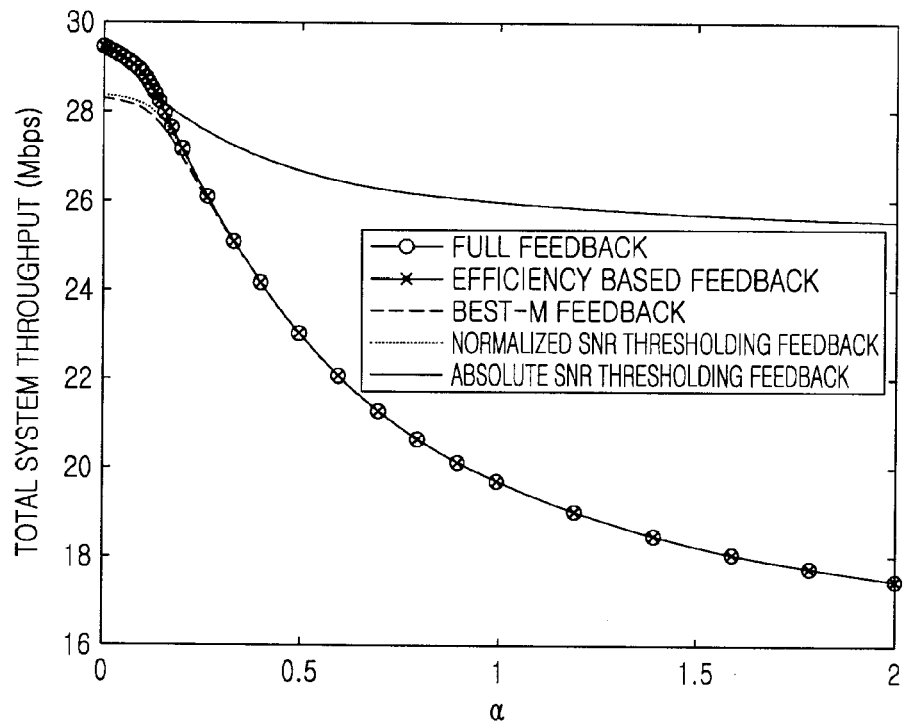
FIG. 3 is a graph comparing a feedback method according to an exemplary embodiment of the present invention with conventional feedback methods in terms of system capacity.
Figure 4:
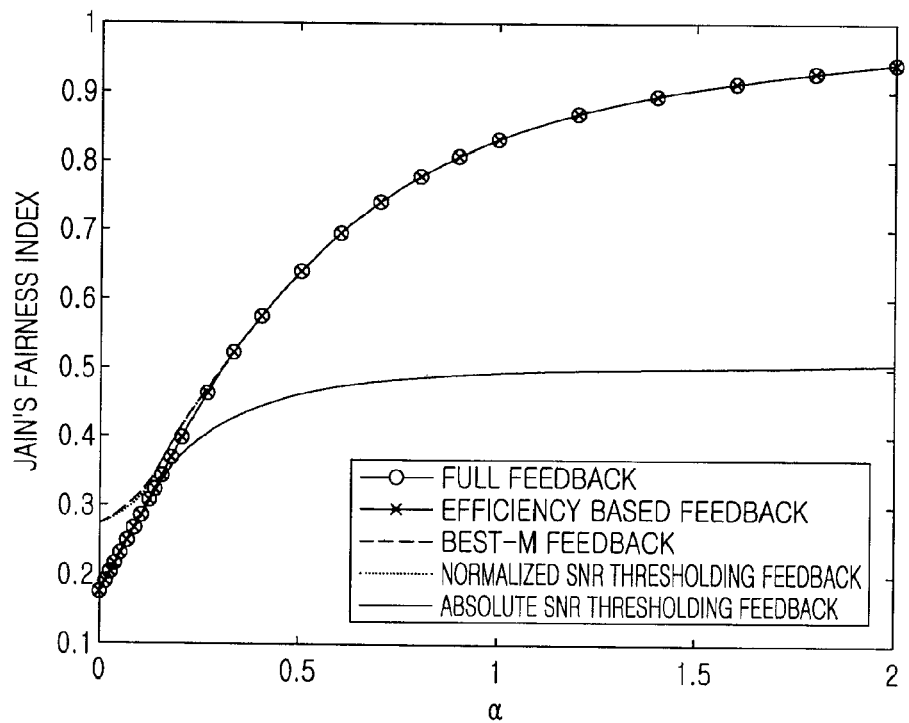
FIG. 4 is a graph comparing the feedback method according to an exemplary embodiment of the present invention with conventional feedback methods in terms of fairness.

Referring to FIGS. 3 and 4, the efficiency-based feedback scheme of exemplary embodiments of the present invention does not exhibit performance degradation in terms of throughput and fairness irrespective of scheduling policies. In FIGS. 3 and 4, α is an index indicating a scheduling policy in an α-PF scheduler. If α is 0, it indicates Max C/I scheduling, if α is 1, it indicates PF scheduling, and if α approaches ∞, it indicates Max-Min Fair scheduling. To represent fairness, the Jain's fairness index is used. The Best-M and NST schemes degrade total feedback performance when α is around 0 and the AST scheme degrades total feedback performance as α increases.

Figure 5:
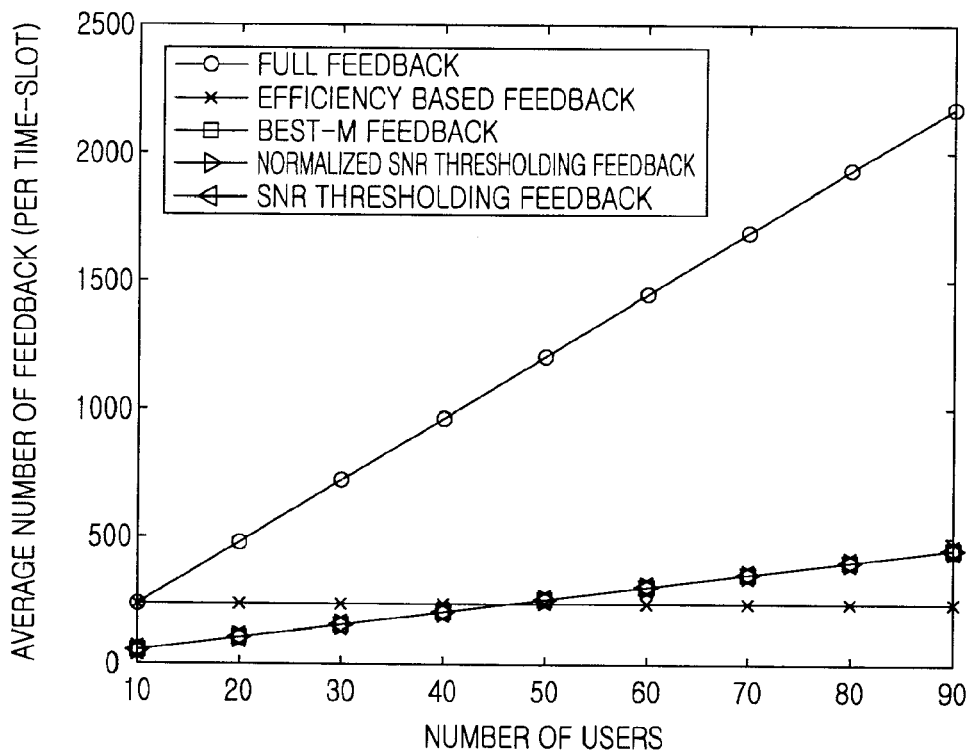
FIG. 5 is a graph comparing the feedback method according to an exemplary embodiment of the present invention with conventional feedback methods in terms of feedback amount.

As illustrated in FIG. 5, the efficiency-based feedback scheme of exemplary embodiments of the present invention reduces a total feedback amount, relative to other feedback schemes. Even when the number of MSs changes, the feedback amount is kept constant in exemplary embodiments of the present invention. It is noted that about 150 feedbacks occur per time slot in the efficiency-based feedback scheme of exemplary embodiments of the present invention, which is explained by the division of the total number of subchannels by the feedback efficiency factor, 24/(1/6.25) in equation (8).

Figure 6:
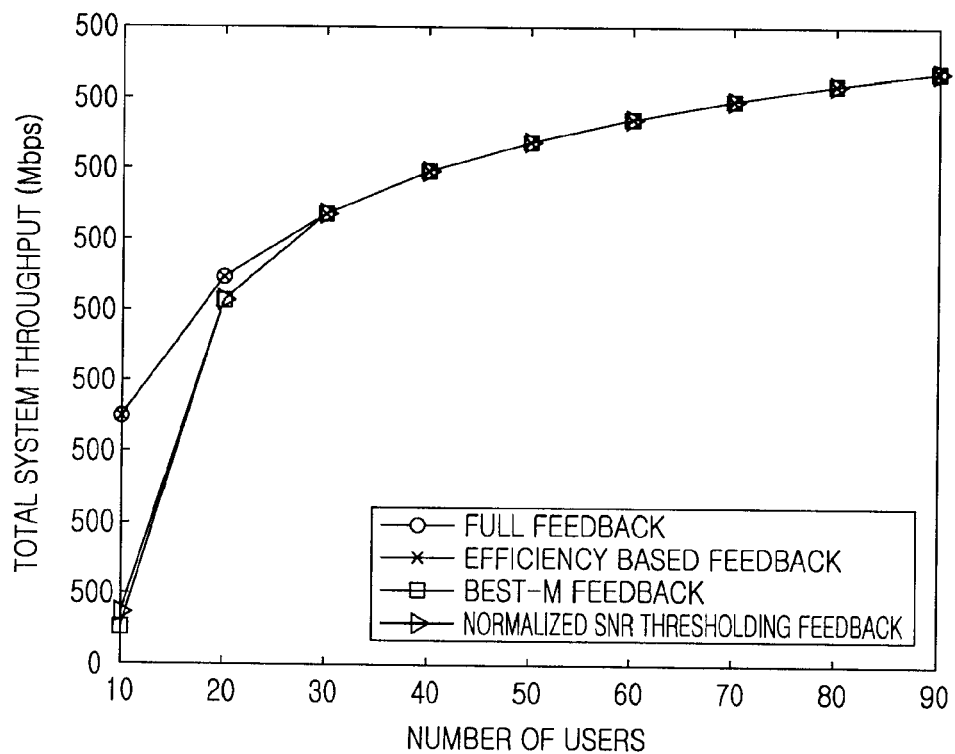
FIG. 6 is a graph comparing the feedback method according to an exemplary embodiment of the present invention with the conventional feedback methods in terms of system capacity.

FIG. 6 reveals that even when the number of MSs changes, each MS actively adjusts its feedback amount and thus there is no performance degradation with respect to full feedback even for a small number of MSs. For a large number of MSs, uplink resources are saved by reducing a feedback amount, compared to other feedback methods, as noted from FIG. 5.

As is apparent from the above description, exemplary embodiments of the present invention advantageously reduce a required feedback amount without degrading system performance by using the efficiency-based feedback scheme. Compared to the conventional feedback methods, exemplary embodiments of the present invention do not distort the characteristics of a scheduler under various scheduling environments and keeps a total feedback amount at a target value.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for feeding back a Channel Quality Indicator (CQI) from a Mobile Station (MS) in a mobile communication system, comprising:
   determining a number of frequency bands for which the MS feeds back CQIs based on a preset feedback efficiency factor;
   selecting the determined number of frequency bands in a descending order of channel quality; and
   feeding back the CQIs of the selected frequency bands to a Base Station (BS).

2. The method of claim 1, wherein the determining of the number of frequency bands comprises computing the number of frequency bands by $$f_k = \text{nint}\left(\frac{\bar{s}_k(t)}{e}\right)$$

where nint(•) represents a nearest integer function, $\bar{s}_k(t)$ denotes an average number of frequency bands allocated to MS k, and e denotes the feedback efficiency factor, ranging between 0 and 1.

3. The method of claim 2, wherein $\bar{s}_k(t)$ is determined by using an exponential weighted moving average scheme by $$\bar{s}_k(t+1) = \left(1 - \frac{1}{t_e}\right) \times \bar{s}_k(t) + \left(\frac{1}{t_e}\right) \times s_k(t)$$

where $t_e$ denotes a window length used for computing the average number of frequency bands allocated to MS k and $s_k(t)$ denotes the current number of frequency bands allocated to MS k.

4. The method of claim 3, wherein the current number of frequency bands allocated to MS k is determined from a control message received from the BS.

5. The method of claim 1, wherein the determining of the number of frequency bands comprises, if the number of frequency bands for which the MS feeds back CQIs is larger than a total number of frequency bands allocated by the BS, determining the number of frequency bands for which the MS feeds back CQIs to be the total number of frequency bands allocated by the BS.

6. The method of claim 1, wherein the determining of the number of frequency bands comprises, if the number of frequency bands for which the MS feeds back CQIs is 0, feeding back a CQI of a frequency band comprising a best channel quality.

7. The method of claim 1, wherein the channel quality is based on at least a Signal-to-Noise Ratio (SNR).

8. The method of claim 1, wherein the feedback efficiency factor is a ratio of the number of frequency bands for which the MS feeds back CQIs to an average number of frequency bands allocated to the MS for a preset time period.

9. The method of claim 1, wherein each frequency band comprises at least one subcarrier.

10. A method for feeding back a Channel Quality Indicator (CQI) from a plurality of Mobile Stations (MSs) in a mobile communication system, comprising:

determining, for each of the plurality of MSs, a number of frequency bands for which the each MS feeds back CQIs, wherein the respective number of frequency bands for which the each MS feeds back CQIs is determined such that a substantially constant ratio is maintained of a sum of the number of frequency bands of all of the plurality of MSs for which CQIs are to be fed back to a total number of frequency bands allocated to all of the plurality of MSs;

selecting, by each of the plurality of MSs, the determined number of frequency bands; and feeding back the CQIs of the selected frequency bands to a Base Station (BS).

11. The method of claim 10, wherein the determining, for each of the plurality of MSs, of the number of frequency bands comprises computing the number of frequency bands by $$f_k = nint\left(\frac{\bar{s}_k(t)}{e}\right)$$

where nint(•) represents a nearest integer function, $\bar{s}_k(t)$ denotes an average number of subchannels allocated to MS k, and e denotes the feedback efficiency factor, ranging between 0 and 1.

12. The method of claim 11, wherein $\bar{s}_k(t)$ is determined by using an exponential weighted moving average scheme by $$\bar{s}_k(t+1) = \left(1 - \frac{1}{t_e}\right) \times \bar{s}_k(t) + \left(\frac{1}{t_e}\right) \times s_k(t)$$

where $t_e$ denotes a window length used for computing the average number of frequency bands allocated to MS k and $s_k(t)$ denotes the current number of frequency bands allocated to MS k.

13. The method of claim 12, wherein the current number of frequency bands allocated to MS k is determined from a control message received from the BS.

14. The method of claim 10, wherein the determining, for each of the plurality of MSs, of the number of frequency bands comprises, if the number of frequency bands for which the respective MS feeds back CQIs is larger than a total number of frequency bands allocated by the BS, determining the number of frequency bands for which the respective MS feeds back CQIs to be the total number of frequency bands allocated by the BS.

15. The method of claim 10, wherein the determining, for each of the plurality of MSs, of the number of frequency bands comprises, if the number of frequency bands for which the respective MS feeds back CQIs is 0, feeding back a CQI of a frequency band comprising a best channel quality.

16. The method of claim 10, wherein the channel quality is based on at least a Signal-to-Noise Ratio (SNR).

17. The method of claim 11, wherein the feedback efficiency factor is a ratio of the number of frequency bands for which a respective MS feeds back CQIs to an average number of frequency bands allocated to respective MS for a preset time period.

18. The method of claim 10, wherein each frequency band comprises at least one subcarrier.

* * * * *